(12) United States Patent
Brun et al.

(10) Patent No.: US 8,812,301 B2
(45) Date of Patent: Aug. 19, 2014

(54) LINGUISTICALLY-ADAPTED STRUCTURAL QUERY ANNOTATION

(75) Inventors: Caroline Brun, Grenoble (FR);
Vassilina Nikoulina, Grenoble (FR);
Nikolaos Lagos, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 326 days.

(21) Appl. No.: 13/245,147

(22) Filed: Sep. 26, 2011

(65) Prior Publication Data
US 2013/0080152 A1    Mar. 28, 2013

(51) Int. Cl.
G06F 17/20    (2006.01)
G06F 17/28    (2006.01)
G06F 17/27    (2006.01)
G06F 17/21    (2006.01)
G10L 21/00    (2013.01)
G06F 17/30    (2006.01)

(52) U.S. Cl.
CPC .......... *G06F 17/271* (2013.01); *G06F 17/2775* (2013.01); *G06F 17/277* (2013.01); *G06F 17/30669* (2013.01); *G06F 17/278* (2013.01); *G06F 17/30684* (2013.01); *G06F 17/2735* (2013.01); *G06F 17/30666* (2013.01); *G06F 17/2818* (2013.01)
USPC .............. 704/9; 704/1; 704/4; 704/5; 704/10; 704/270; 704/270.1; 704/275

(58) Field of Classification Search
USPC ................. 704/1, 4, 5, 9, 10, 270, 270.1, 275
See application file for complete search history.

(56) References Cited

U.S. PATENT DOCUMENTS

| | | | | |
|---|---|---|---|---|
| 6,167,368 | A * | 12/2000 | Wacholder | 704/9 |
| 6,182,028 | B1 * | 1/2001 | Karaali et al. | 704/9 |
| 6,311,152 | B1 | 10/2001 | Bai et al. | |
| 6,490,549 | B1 * | 12/2002 | Ulicny et al. | 704/10 |
| 6,975,766 | B2 | 12/2005 | Fukushim | |
| 7,058,567 | B2 | 6/2006 | Ait-Mokhtar | |
| 7,171,350 | B2 | 1/2007 | Lin | |
| 7,788,085 | B2 * | 8/2010 | Brun et al. | 704/9 |
| 7,853,445 | B2 * | 12/2010 | Bachenko et al. | 704/9 |
| 7,912,705 | B2 * | 3/2011 | Wasson et al. | 704/9 |
| 8,014,996 | B1 * | 9/2011 | Kinder | 704/1 |
| 8,019,590 | B1 * | 9/2011 | Kinder | 704/1 |

(Continued)

OTHER PUBLICATIONS

"The Analysis and Acquisition of Proper Names for the Understanding of Free Text" Sam Coates-Stephens, 1993 Kluwer Academic Publishers. Printed in the Netherlands.*

(Continued)

*Primary Examiner* — Edgar Guerra-Erazo
(74) *Attorney, Agent, or Firm* — Fay Sharpe LLP

(57) ABSTRACT

A system and method for natural language processing of queries are provided. A lexicon includes text elements that are recognized as being a proper noun when capitalized. A natural language query includes a sequence of text elements including words. The query is processed. The processing includes a preprocessing step, in which part of speech features are assigned to the text elements in the query. This includes identifying, from a lexicon, a text element in the query which starts with a lowercase letter and assigning recapitalization information to the text element in the query, based on the lexicon. This information includes a part of speech feature of the capitalized form of the text element. Then parts of speech for the text elements in the query are disambiguated, which includes applying rules for recapitalizing text elements based on the recapitalization information.

22 Claims, 4 Drawing Sheets

(56) References Cited

U.S. PATENT DOCUMENTS

| | | | | |
|---|---|---|---|---|
| 8,019,595 | B1* | 9/2011 | Kinder | 704/9 |
| 8,265,925 | B2* | 9/2012 | Aarskog | 704/9 |
| 2005/0049852 | A1* | 3/2005 | Chao | 704/9 |
| 2006/0136352 | A1* | 6/2006 | Brun et al. | 707/1 |
| 2007/0010993 | A1* | 1/2007 | Bachenko et al. | 704/9 |
| 2008/0027888 | A1* | 1/2008 | Azzam et al. | 706/45 |
| 2008/0071519 | A1* | 3/2008 | Brun et al. | 704/9 |
| 2008/0319978 | A1 | 12/2008 | Brun et al. | |
| 2009/0119268 | A1* | 5/2009 | Bandaru et al. | 707/3 |
| 2009/0204596 | A1 | 8/2009 | Brun et al. | |
| 2009/0326919 | A1* | 12/2009 | Bean | 704/9 |
| 2010/0128042 | A1* | 5/2010 | Confrey et al. | 345/473 |
| 2011/0125487 | A1* | 5/2011 | Ylonen | 704/9 |

OTHER PUBLICATIONS

"Garner's Modern American Usage" By Bryan Garner-2009, available at books.google.com/books?isbn=0199888779.*

Hereafter Poibeau) "Proper Name Extraction from Non-Journalistic Texts" Computational Linguistics in the Netherlands. Selected Papers from the Eleventh CLIN Meeting, May 30, 2001.*

A Manual for BASIC, the elementary algebraic language designed for use with the Dartmouth Time Sharing System. Oct. 1, 1964 Copyright 1964 by the Trustees of Dartmouth College. Reproduction.*

1996) Using word class for part-of-speech disambiguation. In SIGDAT Workshop, pp. 1-13, Copenhagen, Denmark. International Conference on Computational Linguistics. Tzoukermann, E. And Radev, D.R.*

Allan, et al. "Using Part-of-Speech Paterns to Reduce Query Ambiguity", Proc. SIGIR'02, 2002, pp. 307-314.

Barr et al. "The Linguistic Structure of English Web-Search Queries", Proc. Conf. On Empirical Methods on Natural Language Processing, Oct. 2008, pp. 1021-1030.

Bendersky, et al. "Structural Annotation of Search Queries Using Pseudo-Relevance Feedback", CIKM'10, Oct. 26-29, 2010, pp. 1-4.

Bergsma, et al. "Learning Noun Phase Query Segmentation", Proc. 2007 Joint Conference on Empirical Methods in Natural Language Processing and Computational Natural Language Learning, Jun. 2007, pp. 819-826.

Chanod, et al. "Tagging French—comparing a statistical and a contraint-based method", Proc. From Texts to Tags: Issues in Multilingual Language Analysis, 1995, EACL SIGDAT workshop, pp. 58-64, Dublin.

Guo, et al. "A unified and discriminative model for query refinement", Proc. SIGIR'08, Jul. 20-24, 2008, pp. 379-386, Singapore.

Guo, et al. "Named Entity recognition in query", Proceedings of the 32nd international ACM SIGIR conference on Research and development in information retrieval (SIGIR '09), 2009, ACM, pp. 267-274.

Jones, et al. "Generating Query Substitutions", Proceedings of the 15th international conference on World Wide Web (WWW'06), 2006, ACM, pp. 387-396.

Karttunen. "Applications of Finite-State Transducers in Natural-language processing", Proceedings of CIAA-2000, 2000, pp. 34-46.

Moreau. "Best practices in Language resources for multlingual information access", Edited by: TrebleCLEF Consortium, Oct. 2009, pp. 1-77.

Mothe, et al. "Linguistic analysis of users' Queries: towards an adaptive Information Retrieval system", International conference on Signal-Image Technology & Internet-based systems, 2007, pp. 77-84, Shanghai, China.

Pasca. "Weakly-supervised discovery of Named entities using web search queries", CIKM'07, Nov. 6-8, 2007, pp. 683-690, Portugal.

Shen, et al. "Personal name classification in web queries", WSDM'08, Feb. 11-12, 2008, pp. 149-158.

Tan, et al. "Unsupervised query segmentation using generative language models and wikipedia", WWW'08, Apr. 21-25, 2008, pp. 1-10, Beijing, China.

Zhu, et al. "A unified framework for recommending diverse and relevant queries", WWW'2011, Mar. 28-Apr. 1, 2011, pp. 37-46, India.

Roulland, et al.; U.S. Appl. No. 12/720,900, filed Mar. 10, 2010, entitled "System and Method for Guiding Entity-Based Searching".

Nikoulina, et al.; U.S. Appl. No. 13/173,582, filed Jun. 30, 2011, entitled "Translation System Adapted for Query Translation Via a Reranking Framework".

* cited by examiner

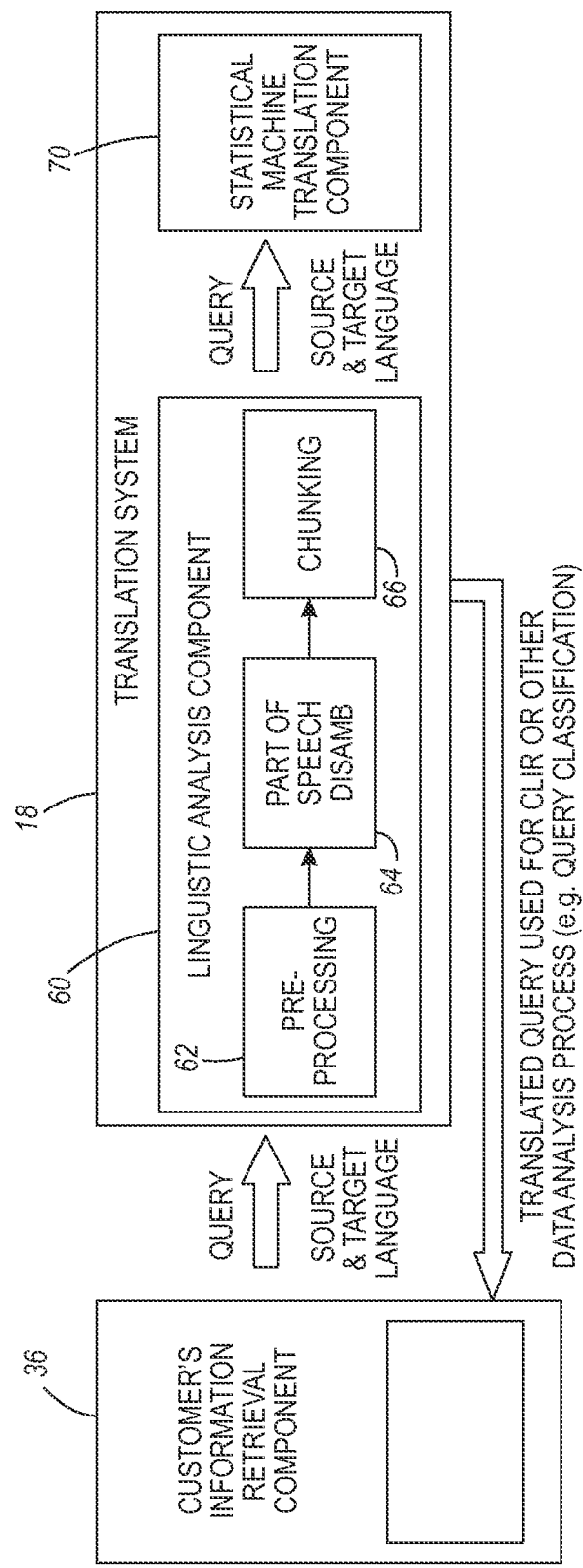

LINGUISTICALLY-ADAPTED STRUCTURAL QUERY ANNOTATION

BACKGROUND

The exemplary embodiment relates to natural language processing and finds particular application in the processing of queries used to retrieve information from a database.

Query processing is widely performed as an initial step in various domains, such as information access and data analytics, to improve retrieval performance. Typically, the processing involves such things as simple stop word removal and stemming. Many Natural Language Processing (NLP) tools, while widely used for processing complete sentences in a given natural language are, however, inappropriate for processing of queries. Consider, for example, a French language query "coupe apollon." While with standard text processing techniques, "coupe" would be likely to be identified as a verb (corresponding to "cut" in English), in the context of this query it should be tagged as a noun ("cup"). Full sentence analysis methods, while useful for sentences where the grammar and syntactic structure follow those of the given language, are not designed to cope with the freeform structure and misspelling often associated with queries.

To address the processing of queries, several approaches have been proposed for customizing some of the components for query structures. Advanced parsing techniques that are able to treat queries as a collection of phrases rather than single terms have been proposed (see, for example, Josiane Moth, et al., "Linguistic Analysis of Users' Queries: towards an adaptive Information Retrieval System," *Int'l Conf. on Signal-Image Technology & Internet-Based Systems*, Shanghai, China, 2007). Morphological analyzers, chunkers, and named entity recognizers are also regarded as potentially useful tools in the development of a successful information access application.

However, prior attempts at query processing, often referred as structural query annotation, have generally considered capitalization, named entity detection, PoS tagging and query segmentation independently and address only one of the above issues. For example, named entity recognition has been considered independently of other query processing steps (see, Jiafeng Guo, et al., "Named entity recognition in query," in *Proc. 32nd Int'l ACM SIGIR Conf. on Research and Development in Information Retrieval* (SIGIR'09) pp. 267-274 (2009); Marius Pasca, "Weakly-supervised discovery of named entities using web search queries," in *Proc. 16th ACM Conf. on Information and Knowledge Management* (CIKM '07) pp. 683-690 (2007); and Dou Shen, et al., "Personal name classification in web queries," in *Proc. Int'l Conf. on Web search and web data mining* (WSDM '08) pp. 149-158 (2008)).

Work on query segmentation has been based on the statistical interaction between a pair of query words to identify the border between the segments in the query (see, Jones, et al., "Generating query substitutions," in *Proc. 15th Int'l Conf. on World Wide Web* (WWW '06), pp. 387-396 (2006); Guo et al., "A Unified and Discriminative Model for Query Refinement," *Proc. SIGIR'08*, pp. 379-386 (2008).) The segmentation proposed by Bergsma and Wang uses a machine-learned query segmentation system trained on a small, manually annotated set of queries (see, Shane Bergsma, et al., "Learning Noun Phrase Query Segmentation," *Proc. 2007 Joint Conf. on Empirical Methods in Natural Language Processing and Computational Natural Language Learning*, pp. 819-826 (2007)).

PoS tagging is used in many tasks in information analytics, such as query reformulation, query segmentation, and the like. However PoS tagging has generally not been considered to be adapted for queries themselves. Allan and Raghavan consider that PoS tagging may be too ambiguous for short queries and propose to interact with the user for disambiguation (see James Allan and Hema Raghavan, "Using part-of-speech patterns to reduce query ambiguity. In *Proc. SIGIR'02*, pp. 307-314 (2002). In the method of Barr, et al., a set of manually annotated queries is produced and then a Brill tagger is trained on this set in order to create an adapted PoS tagger for search queries (see, Barr, et al., "The Linguistic Structure of English Web-Search Queries," *Proc. Conf. on Empirical Methods on Natural Language Processing* (EMNLP'08), pp. 1021-1030, October 2008.

Bendersky, et al., proposes applying probabilistic models for capitalization, PoS tagging, and query segmentation, independently. The models rely on a document corpus rather on the query itself (Michael Bendersky, et. al., "Structural Annotation of Search Queries Using Pseudo-Relevance Feedback," Proc. *CIKM'10*, pp. 1537-1540 (2010)). Such an approach is not generally applicable since most content providers do not provide access to their document collection. Moreover, the query expansion which is central to this approach is not possible for most digital libraries that are organized in a database.

A system and method are disclosed for processing queries which enable Natural Language processing tools to be utilized more effectively in query processing.

INCORPORATION BY REFERENCE

The following references, the disclosures of which are incorporated herein by reference in their entireties, are mentioned:

U.S. Pub. No. 20080319978, published Dec. 25, 2008, entitled HYBRID SYSTEM FOR NAMED ENTITY RESOLUTION, by Caroline Brun, et al., discloses a system which is capable of identifying metonymic uses of named entities.

U.S. Pat. No. 7,058,567, entitled NATURAL LANGUAGE PARSER, by Ait-Mokhtar, et al. discloses a finite state parser which may be utilized in natural language processing.

U.S. Pub. No. 20090204596, published, Aug. 13, 2009, entitled SEMANTIC COMPATIBILITY CHECKING FOR AUTOMATIC CORRECTION AND DISCOVERY OF NAMED ENTITIES, by Caroline Brun, et al., discloses a method including identifying an attributive relationship between a named entity or proper noun and an attribute in a text string, which allows a proper name to be recognized as a new named entity or other information to be associated with the text string.

U.S. application Ser. No. 12/720,900, filed on Mar. 10, 2010, entitled SYSTEM AND METHOD FOR GUIDING ENTITY-BASED SEARCHING, by Frederic Roulland, et al., discloses clustering of entity structures to form a tree structure which allows a user to navigate the tree in order to refine a query relating to a chosen entity.

U.S. patent application Ser. No. 13/173,582, filed Jun. 30, 2011, entitled TRANSLATION SYSTEM ADAPTED FOR QUERY TRANSLATION VIA A RERANKING FRAMEWORK, by Vassilina Nikoulina, et al., discloses a translation method in which translated queries are reranked, based on a measure of their information retrieval performance.

BRIEF DESCRIPTION

In accordance with one aspect of the exemplary embodiment, a method for processing queries includes providing access to a lexicon which includes a set of text elements that start with a lowercase letter and which are recognized in the lexicon as being proper nouns when in a capitalized form of the text element. A natural language query to be processed is received. The query includes a sequence of text elements, the text elements comprising words. The method further includes processing the query, for example, with a computer processor. This includes assigning part of speech features to the text elements in the query. The assigning includes, for a text element in the query which starts with a lowercase letter and which is among the set of text elements in the lexicon which are recognized as being proper nouns when in a capitalized form, assigning recapitalization information to the text element. The recapitalization information includes a part of speech feature of the capitalized form of the text element. The processing includes disambiguating parts of speech for the text elements in the query including applying rules for recapitalizing text elements based on the recapitalization information, chunking the disambiguated query. The processed query is output.

In another aspect, a system for processing queries includes a lexicon which stores a set of text elements that start with a lowercase letter that are indexed as being proper nouns when in a capitalized form in which the first letter is capitalized. Memory receives a natural language query to be processed, the query including a sequence of text elements, the text elements including words. A linguistic analysis component is provided for processing the query. This includes a preprocessing component for preprocessing the query, the preprocessing component assigning part of speech features to the text elements in the query. The assigning includes assigning recapitalization information to the text elements which are in the set of text elements, the recapitalization information comprising proper noun information of the capitalized form of the text element. A part of speech disambiguation component is provided for disambiguating parts of speech for the text elements in the query. The part of speech disambiguation component applies rules for recapitalizing text elements based on the recapitalization information. A chunking component is provided for chunking the disambiguated query. A processor implements the linguistic analysis component.

In another aspect, a method for processing queries includes generating a lexicon comprising a set of text elements that start with a lowercase letter and which are recognized as being proper nouns when in a capitalized form of the text element. A natural language query to be processed is received. The query includes a sequence of text elements, the text elements comprising words. The query is processed. This includes assigning part of speech features to the text elements in the query, the assigning including for a text element in the query which is among the set of text elements in the lexicon, assigning recapitalization information to the text element. The recapitalization information includes a part of speech feature of the capitalized form of the text element. Disambiguating of ambiguous parts of speech for the text elements in the query includes applying rules for recapitalizing text elements based on the recapitalization information. The processed query is output.

BRIEF DESCRIPTION OF THE DRAWINGS

FIG. 4 illustrates one example embodiment of the system of FIG. 1.

DETAILED DESCRIPTION

Figure 1:
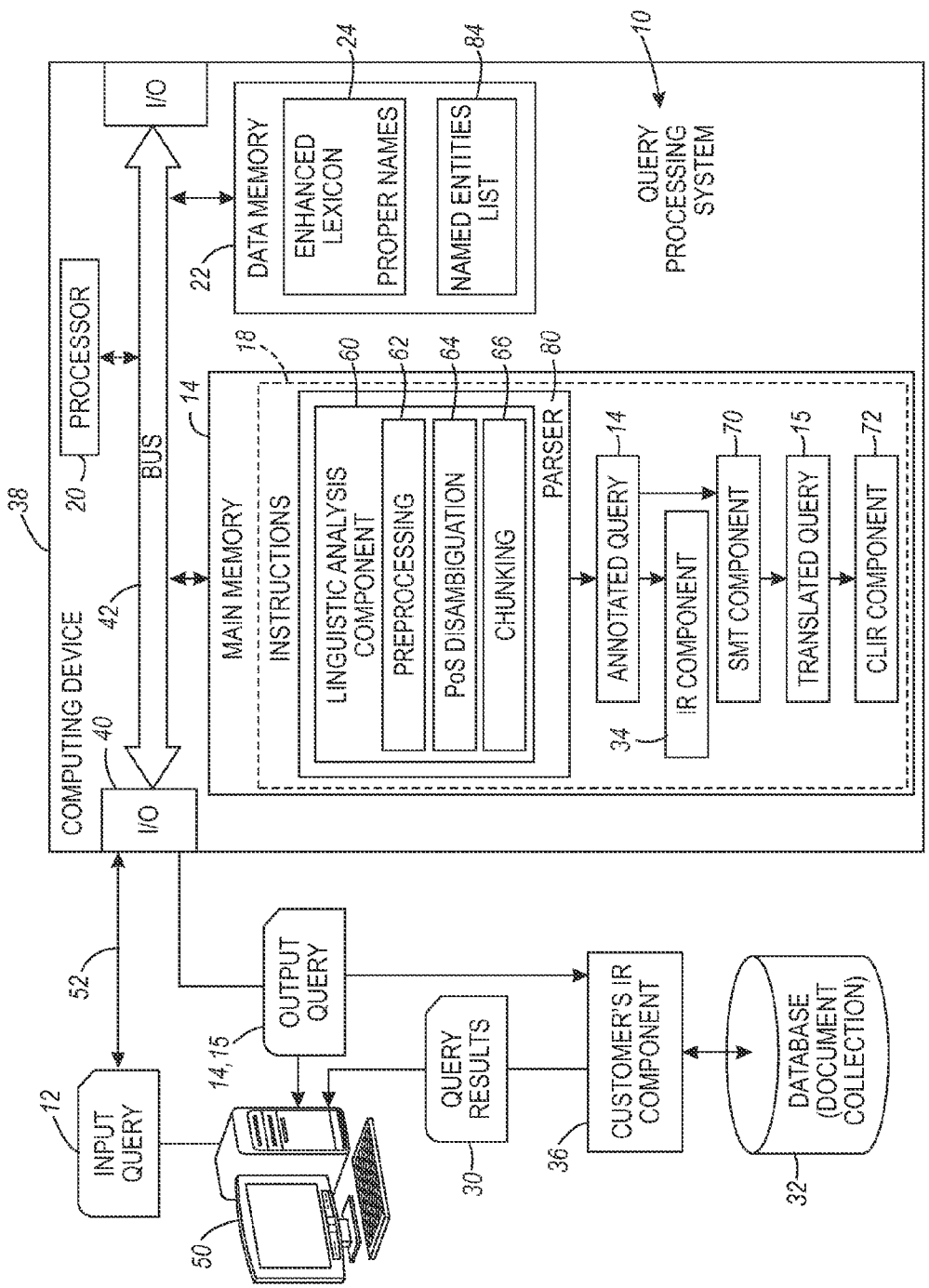
FIG. 1 is a functional block diagram of an environment in which a system for query annotation operates in accordance with one aspect of the exemplary embodiment.

Aspects of the exemplary embodiment relate to a system and method for processing short text strings in the form of queries. In the exemplary embodiment, the input query is natural language processed in a method which provides for Part of Speech (PoS) tagging, recapitalization, chunking, and named entity recognition (NER) in an adaptive framework. The system and method address a problem with existing systems which do not provide a flexible approach to recapitalization, chunking, and PoS tagging of queries.

A "query," as used herein, includes a text string, such as a phrase or a few words, which is used to retrieve responsive documents from a document collection. Queries may be less than a complete sentence and are often of ten words or less. The documents which may be retrieved in response to the query generally include text documents in a natural language. The query may be translated into another language before retrieval of responsive documents.

A "proper name," or proper noun, (PN) is a noun representing a unique entity, which has a unique referent in the world, such as a specific person, place or thing, as distinguished from common nouns which describe a class of entities. In practice, however, what constitutes a proper noun depends on the lexicon being used, i.e., whether the lexicon has been constructed so as to recognize a particular text element as a proper noun. Proper names are generally capitalized, but in the present application, due to misspelling, uncapitalized nouns can be recognized as proper nouns. Examples of proper nouns are each part of a person's name, location names, names of monuments and buildings, names of historical events, documents, and time periods, organizations and other groups, brand names, and the like. A "named entity" (NE) generally comprises a text element which identifies an entity by name and which belongs to a given semantic type and for the present application, can be regarded as a specialized type of proper noun. For example, types of named entities may include persons, organizations, locations, artifacts, specific dates, and monetary expressions.

A "document," as used herein can be any stored text in a natural language, such as an entire stored document or portion thereof. Some documents may include images as well as text. A document can thus be any one or more of a text file, PDF, XML, or other structured or semi-structured document, an image or a video/audio file, with a short description in natural language, or the like, from which a text string can be extracted.

An "annotation," or "label" as used herein, can be any associated information, such as a link, associated file, tag, such as an XML tag, or the like, which allows linguistic information to be associated with a text element of a text string, such as a query.

A "text element" can be a word or phrase which forms a whole or a part of a query.

A "lexicon" can be a data structure, program, object, or device that indicates a set of words that may occur in a natural language set. A lexicon may be said to "accept" or "recognize" a word it indicates, and those words may thus be called "acceptable" or may be referred to as "in" or "recognized by" the lexicon. The exemplary lexicon can include both proper noun and named entity information.

The exemplary system and method are particularly suited to the processing of queries. Queries have specific linguistic properties that make their analysis difficult for standard NLP tools. The exemplary method seeks to improve query chunking by relying on the specific linguistic properties of the queries to adapt different steps of linguistic analysis, from preprocessing to chunking.

Figure 2:
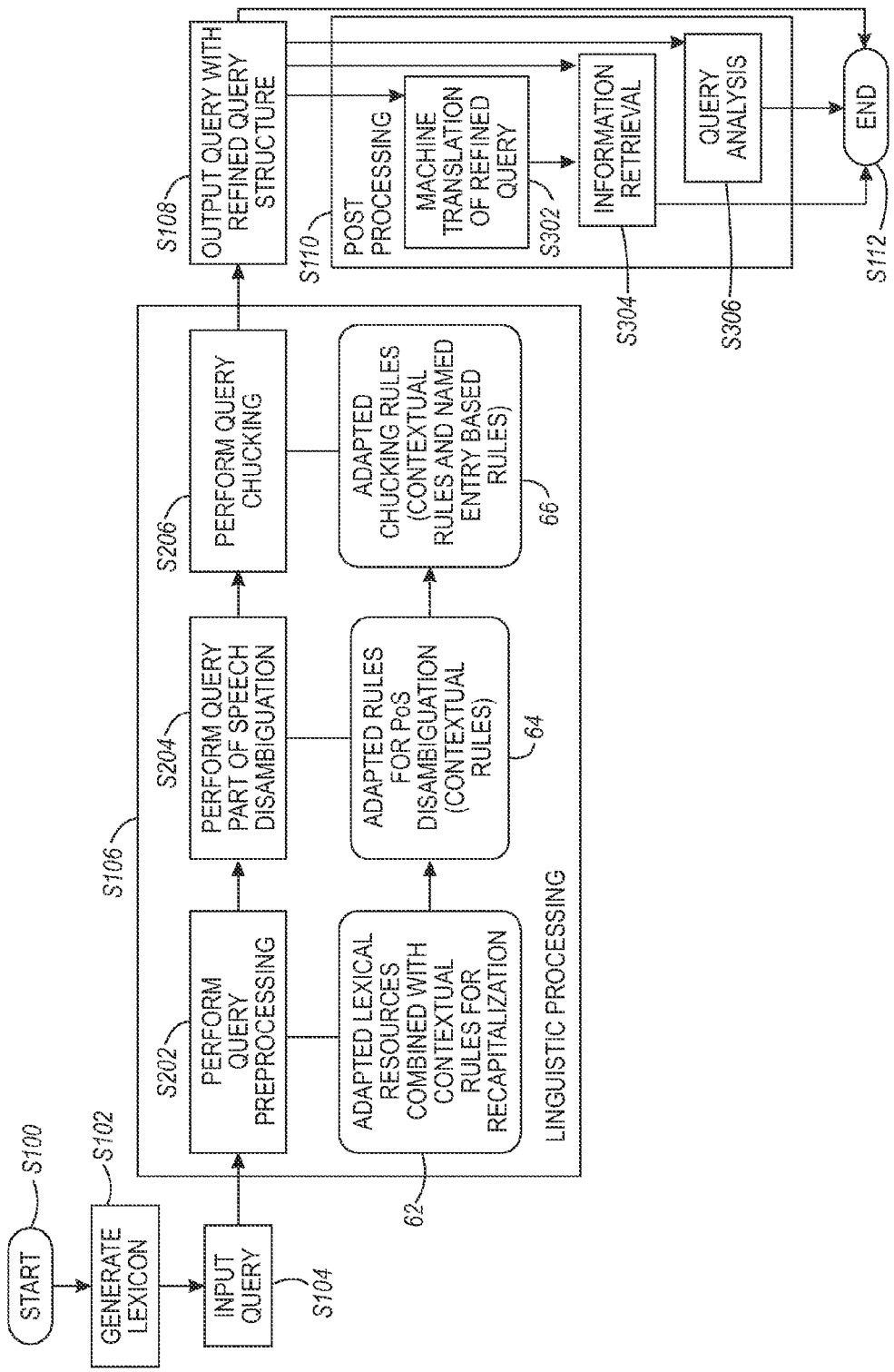
FIG. 2 is a flow chart illustrating a method for query annotation in accordance with another aspect of the exemplary embodiment.

FIG. 1 illustrates an exemplary query processing system 10 in accordance with one aspect of the exemplary embodiment, which can be used to perform the method illustrated in FIG. 2. The system 10 is adapted to receiving an input query 12 in a first natural language, such as French, and for outputting an output query. The output query may be an annotated query 14 in the same natural language as for the input query 12 or may be a translated query 15, generated by translating the annotated query 14 into a second natural language (target language), e.g., English, i.e., a language that is different from a first natural language (source language) of the input query 12.

The system 10 includes main memory 16 in which are stored instructions 18 for performing the exemplary method(s) described herein. A processor 20, in communication with the memory 16, is configured for executing the instructions 18. Data memory 22, which may be separate from or integral with the main memory 16, stores a lexicon 24 which lists, or otherwise stores in a data structure, words and phrases in the first natural language together with lexical information for those words and phrases. The lexicon 24 can be a conventional lexicon which has been enhanced with information which makes it suited to processing of queries. In particular, the lexicon 24 includes, for at least some words (nouns or more generally, noun phrases) that can be proper nouns when the first letter of the word is capitalized, information which links the uncapitalized form of the word to the corresponding capitalized form. Thus, for example, the uncapitalized word bob may linked, in the lexicon 24, to the capitalized form Bob, which is associated, in the lexicon, with information designating it as being a proper noun (of type person-first name). This favors the treatment of the word bob in a query as a proper noun, rather than as a verb, at least in certain contexts. The information stored in the Lexicon thus allows recapitalization of certain nouns on the assumption that a proper noun (or, in some cases, specifically a named entity) was intended by the submitter.

The output query 14, 15 can be used for retrieving responsive documents 30 from a document collection 32, e.g., by an information retrieval (IR) component 34 (search engine) stored locally, e.g., in memory 16, or by a customer's information retrieval component 36 stored remotely from the system, e.g., to which the system 10 has no access. The information retrieval component 36 can thus be a customer's native search engine that is either a customized or commercial software tool. The system 10 may also have no access to the document collection 32 used by the customer, and thus makes no use of the document collection 34 in query processing.

The exemplary query processing system 10 is resident on one or more computing devices 38 and includes one or more input/output devices 40 for communicating with external devices. Hardware components 16, 20, 22, 40 of the system 10 may be communicatively linked via a data/control bus 42.

The input query 12 can be input to the system 10 in any suitable form, e.g., from a customer-operated client device 50, which is connected with the system 10 via a wired or wireless link 52, such as a wired connection, local area network, or wide area network, such as the Internet. In other embodiments, the query 12 is input to the system from a memory storage device, such as a disk or memory stick, or is at least partially generated within the system 10, itself.

The system 10 includes, e.g., stored in memory 16, or accesses from remote memory, a linguistic analysis component 60, which is used to perform the linguistic analysis of the input query 12 (including PoS disambiguation and chunking). In accordance with the exemplary embodiment, the linguistic analysis component 60 includes a query preprocessing component 62, a Part of Speech disambiguation component 64, and a chunking component 66, which are best understood with reference to the exemplary method shown in FIGS. 2-3.

Briefly, the linguistic analysis component 60 takes as input the query 12, in the language in which the query is input, and outputs an annotated query 14 including one or more query units (chunks), each query unit generally comprising one or more words. In one embodiment, the annotated query 14 is output to the client device 50 or to the local IR component 34. In another embodiment, the annotated query 14 is input to a machine translation component 70, such as a statistical machine translation (SMT) component. The machine translation component translates the annotated query into a second language, thereby generating a translated query 15, which is output from the SMT component 70. The translated query 15 may be enriched with the adapted linguistic analysis of the query 14 which has been provided by the linguistic analysis component 60. The translated query 15, which includes one or more query units in the second language, may be output to a local cross language information retrieval (CLIR) component 72, which is configured for retrieving documents from a document collection 32 that are primarily in the second language. In another embodiment, the translated query 15 is output to the customer to be fed to the customer's IR component 36 to be used in cross language information retrieval. The translated query 15 can thus return results in the target language(s).

As will be understood, MT component 70 may be a statistical machine translation system including a decoder, which retrieves a set of biphrases from a source language-target language biphrase library, each of the biphrases covering at least one word of the annotated query 14. The SMT component 70 also includes a translation scoring component which scores combinations of these biphrases in which each word of the annotated query and each word of a candidate translated query is covered by no more than one biphrase. An optimal combination of the biphrases, based on the scores, is output as the translated query 15. As will be appreciated, the SMT component 70 may output several translated queries from a single annotated query. The SMT component 70 may utilize the query annotations output by the linguistic analysis component in performing the translation. The annotations may thus be used by the decoder, the translation scoring component, or both. For example, the query annotations may be used in limiting the biphrases which the decoder can accept, e.g., due to the chunking, or to favor translations by the translation scoring component, e.g., in which words of a chunk are covered by the same biphrase.

The computer system 38 may include one or more specific or general purpose computers, such as a PC, such as a desktop, a laptop, palmtop computer, portable digital assistant (PDA), server computer, cellular telephone, tablet computer, pager, combination thereof, or other computing device capable of executing instructions for performing the exemplary method. In some cases, software components may be wholly or partly resident on the client computing device. Client device 50 may be configured similarly to the computer system 38, i.e., with memory, a processor, and one or more network interfaces for communicating with external devices.

As will be appreciated, the output query 14, 15, may be returned to the same client computing device 50 which provided the input query or to a different computing device.

The memory 16, 22 may represent any type of non-transitory computer readable medium such as random access memory (RAM), read only memory (ROM), magnetic disk or tape, optical disk, flash memory, or holographic memory. In one embodiment, the memory 16, 22 comprises a combination of random access memory and read only memory. Memory 16, 22 stores instructions for performing the exemplary method as well as the processed data. In some embodiments, the processor 20 and memory 16 and/or 22 may be combined in a single chip. The exemplary network interface(s) 40 allow(s) the computer to communicate with other devices via a computer network and may comprise a modulator/demodulator (MODEM).

The digital processor 20 can be variously embodied, such as by a single-core processor, a dual-core processor (or more generally by a multiple-core processor), a digital processor and cooperating math coprocessor, a digital controller, or the like. The digital processor 20, in addition to controlling the operation of the computer 38, executes instructions stored in memory 16 for performing the method outlined in FIGS. 2 and 3.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

FIG. 2 illustrates the exemplary method or processing queries. The method begins at S100.

At S102, a lexicon 24 adapted to use in the linguistic processing stage is provided/generated. This can be considered a preliminary step and may be performed elsewhere than in the exemplary system 10.

At S104, a natural language query 12 to be processed is input to the system 10 and may be stored in memory, such as memory 22, during processing. The input query is in a source language. The query 12 may be input by a user typing on a keyboard, touch screen or the like, or otherwise entering the query on the client device 50. Device 50 includes an application in memory for uploading the textual query 12 to the system 10.

At S106, linguistic processing that is adapted to queries is performed on the input query, as described in further detail below. The processing is designed to add annotations to the query.

At S108, an annotated query 14 in the source language is output. The annotations are intended to provide the query with a refined query structure.

At S110, one or more post-processing operations may be performed on the annotated query.

The method ends at S112.

The linguistic processing stage S106, which is adapted to queries, broadly includes a preprocessing stage S202, in which the input query 12 undergoes preprocessing, a disambiguation stage S204, in which the candidate parts of speech for the preprocessed query output by S202 are disambiguated, and a chunking stage S206, in which the disambiguated query output by S204 is processed to identify chunks.

In the optional post-processing stage S110, the annotated query 14 may be translated at S302, used to perform information retrieval at S304, which may follow the translation step, and/or used for query analysis at S306.

The following adaptations may be integrated into the three general linguistic processing steps (S202, S204, S206):

1. Recapitalization: In the preprocessing step S202, the method identifies and "recapitalizes" uncapitalized (lowercase) text elements (words or phrases) in queries that can be proper nouns when they start with a capital letter. In particular, the preprocessing component 62 accesses the lexicon 24 to determine whether the lowercase text element has a capitalized form which is listed as a proper noun in the lexicon. In the recapitalization, the text element may be annotated as being capitalized and/or linked to its capitalized form through the lexicon, allowing features of the capitalized form to be associated with the text element as an annotation. The preprocessing of the query may thus include assigning part of speech features to the text elements in the query (at this stage, the parts of speech can be ambiguous, i.e., the part of speech features can include more than one part of speech assigned to a text element). Where applicable, when identified from the lexicon, a text element in the query which starts with a lowercase letter and which is indexed in the lexicon as being a proper noun when in its capitalized form is assigned part of speech feature(s) of the capitalized form of the text element.

In one embodiment, a recapitalization rule which associates this candidate proper noun PoS information to a text element is applied to all uncapitalized words in queries that can be proper nouns when they start with a capital letter. In another embodiment, rules are applied which favor or enforce recapitalization only of specific classes of proper nouns (i.e., fewer than all types of proper noun), such as those indexed as "person" and "place" names.

2. Part of Speech disambiguation: The exemplary disambiguation stage of the method (S204) is adapted (by incorporation of contextual rules) to perform one or more of:
   a. Guiding the part of speech tagging in order to favor nominal interpretation (i.e., PoS tags that designate a noun). This is in contrast to conventional PoS taggers, which are designed to find a verb in the input, on the assumption that a complete sentence will include at least one verb.
   b. Using the recapitalization information obtained from the recapitalization (in S202) in order to change the part of speech interpretation in some contexts (as discussed below).

3. Chunking: the chunking (S206) is adapted (by incorporation of contextual rules) to perform chunking based on one or more of:
   a. Using named entities and considering a full named entity as an entire chunk. This differs from standard text processing, where a named entity can be just a part of a chunk.
   b. Grouping coordinated named entities of the same type.
   c. Performing attachment of a prepositional phrase (PP) or adjectival phrase (AP) with the closest antecedent that is morphologically compatible with it.

These processes are applicable to queries in various application domains. It is also contemplated that there may some domain-dependent adaptations (for example, named entities may vary across domains).

In the exemplary method, part of the recapitalization is performed during the PoS tagging stage (S204), in interaction with named entity recognition, which allows these two steps to be considered as interleaved. Moreover, the linguistic processing employed can generic, i.e., corpus-independent (at least for most of its parts except, optionally, for Named Entity recognition)n and thus does not require access to a specific document collection for the linguistic processing (S106), and can be both relatively simple and fast.

Further details of the system and method will now be described.

Integration of the Linguistic Processing into an Incremental Linguistic Parser

The exemplary linguistic analysis component 60 can be integrated into an existing parser 80, such as an incremental parser. In general, the parser 80 takes as input a text string e.g., of extended mark-up language (XML) document, or group of documents and applies a set of rules, called a grammar, dedicated to a particular natural language such as French, English, or Japanese. A grammar is written in a formal rule language, and describes the word or phrase configurations that the parser tries to recognize. The basic rule set used to parse basic documents in French, English, or Japanese is called the "core grammar." Additional rules may be appended and launched along with the basic set of rules, such as the exemplary linguistic analysis component 60.

An exemplary parser 80 which can be adapted to the processing of queries is the Xerox Incremental Parser (XIP), as described, for example, in U.S. Pat. No. 7,058,567 to Ait-Moktar, incorporated herein by reference in its entirety, and in Aït-Mokhtar S., Chanod, J. P., Roux, C. "Robustness beyond Shallowness: Incremental Dependency Parsing," Special issue of NLE journal (2002) (hereinafter "Aït-Mokhtar 2002"); Aït-Mokhtar, et al. "Incremental Finite-State Parsing," Proceedings of Applied Natural Language Processing, Washington, April 1997; and Aït-Mokhtar, et al., "Subject and Object Dependency Extraction Using Finite-State Transducers," Proceedings ACL'97 Workshop on Information Extraction and the Building of Lexical Semantic Resources for NLP Applications, Madrid, July 1997.

By way of example, the adaptations have been implemented within the XIP engine for the French and English grammars. The XIP framework allows integrating the adaptations of different steps of query processing into a unified framework, where the changes from one step can influence the result of the next step. Specifically, the information performed at a given step is transmitted to the next step by XIP through linguistic features (annotations).

As will be appreciated, rather than processing all the text, a dedicatedlinguistic analysis component 60/ parser may be employed which includes a more limited set of rules dedicated primarily to the exemplary methods disclosed herein.

In an initial stage, the parser 80 takes, as input, the query and breaks it down into a sequence of tokens (words, numbers, punctuation, etc.). Morphological information is then associated with each token, which in the case of words, includes associating parts of speech for those words in the query that are recognized in the lexicon 24. The reprocessing component rules 62, operating on top of the standard parser rules, ensure that recapitalization annotations are associated with lowercase words, where appropriate, which identify them as being a proper noun when capitalized. The words may have more than one part of speech associated with them at the preprocessing stage, which is then disambiguated at the disambiguation stage, using general parser rules, on top of which are applied the specific PoS disambiguation rules 64.

Generating the Adapted Lexicon (S102)

The lexicon 24 can be based on an existing lexicon which has been specifically adapted to processing queries. In a conventional lexicon, certain nouns and noun phrases are associated with lexical information designating them as a proper noun. Additionally, each proper noun may be associated, in the lexicon, with one or more features, such as a given class selected from a finite set of classes, such as person-given name (e.g., first name), person-family name (i.e., surname or patronym, often placed as the last name), location name (such as a country, state, town, geographic region, or the like), organization name (such as a corporation, institution, association, government or private organization, or the like), etc. To generate the adapted lexicon 24, additional information is provided. In one embodiment, the lexicon is adapted such that all uncapitalized words (and phrases) that can be proper nouns when they start with a capital letter are linked to the capitalized form. In one embodiment, this linking is only for specific classes of proper nouns (i.e., fewer than all types of proper noun), such as for person and place names. Thus, for example, the adapted lexicon 24 includes such a link for all words starting with a lower case letter which can be a first name (e.g., henry, jean, bob, pat . . . ), or family and/or celebrity name already known in the conventional lexicon (chirac, picasso . . . ) when they start with a capital letter. The adapted lexicon 24 also includes all words (and phrases) starting with a lower case letter which can be place names with a capital letter in the conventional lexicon (paris, new york . . . ).

As will be appreciated, rather than starting with an existing lexicon, an adapted lexicon 24 may be generated from scratch in which a set of uncapitalized nouns are each associated with information denoting them as a proper noun, when capitalized.

In addition to utilizing the lexicon for identifying named entities, the system may include or access a classical named entity recognition system (NER). Such a system usually associates a predefined class to the identified entity, such as PERSON, PLACE, ORGANIZATION, DATES, etc. Automated name entity recognition systems which may be employed are described, for example, in U.S. Pat. Nos. 7,171,350; 6,975, 766, and 6,311,152 and application Ser. Nos. 11/846,740 and 12/028,126, which are incorporated herein by reference in their entireties. Caroline Brun, Caroline Hagege, Intertwining deep syntactic processing and named entity detection. ESTAL 2004, Alicante, Spain, Oct. 20-22 (2004), provides another example of a NER system which is combined with a robust parser, which may be used herein.

Preprocessing (S202)

Figure 3:
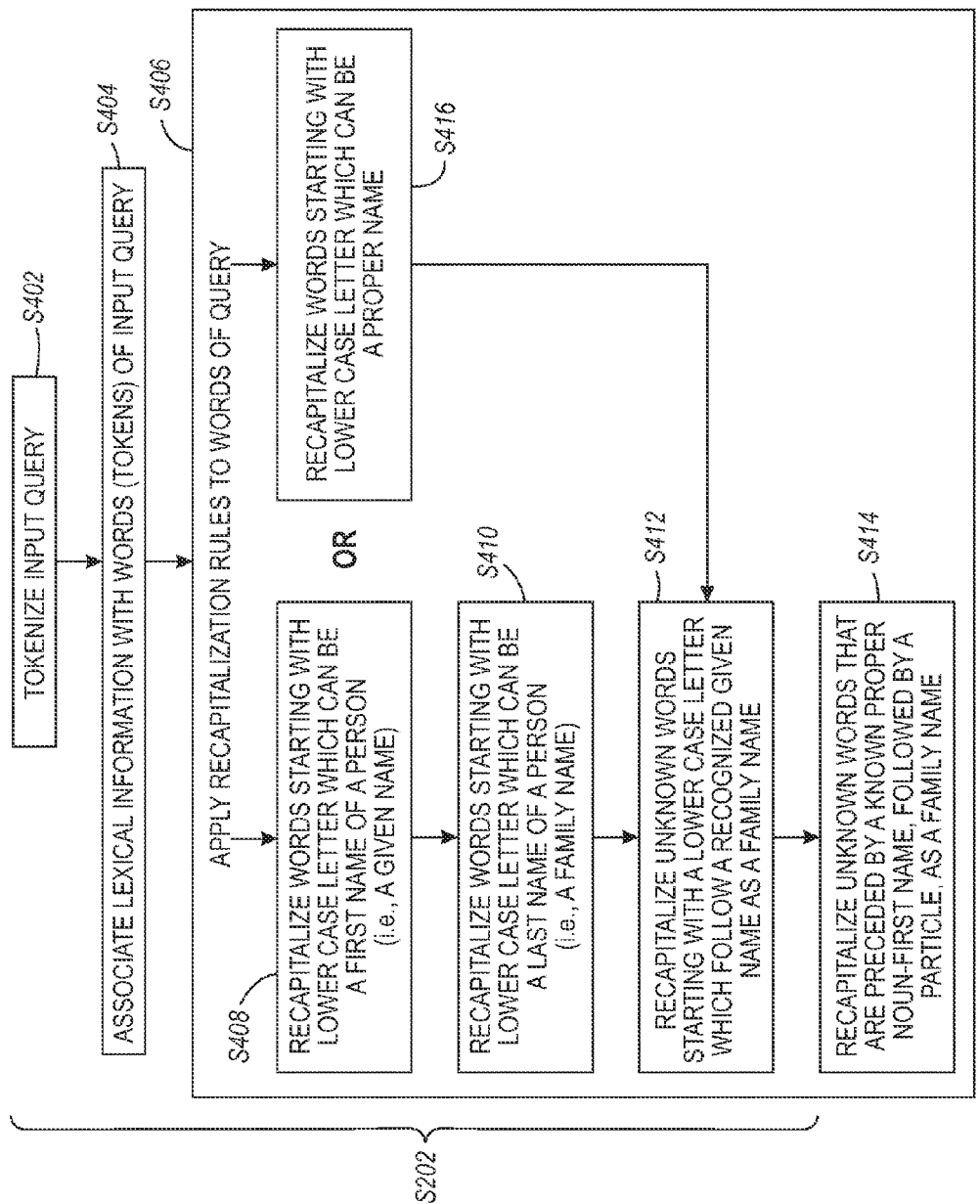
FIG. 3 is a flow chart illustrates part of the query preprocessing in the method of FIG. 2.

The preprocessing component 62 takes as input the query 12 and associates lexical information with the query by accessing the lexicon 24. FIG. 3 illustrates aspects of S202 in accordance with the exemplary embodiment.

The query 12 is broken by the parser 80 into base constituent parts, typically including words and punctuation (S402). Each word, punctuation mark, or other element is typically referred to as a token. Generally, the preprocessing component 62 assigns features to the identified text tokens, e.g., by applying finite state transducers (S404). Specifically, an attempt is made to associate each word or token with lexical information contained in the lexicon 24. The lexicon may include morpho-syntactic information, semantic information, and associated parts of speech.

In particular, the preprocessing component 62 associates part of speech features from a list of features, such as indefinite article, noun, verb, and other parts of speech, with each recognized word or other text element in the input query 12.

Some words may have more than one label for example the word master may be labeled as both a verb and a noun.

For words unrecognized in the lexicon 24, a lexical guesser may be used to guess the part of speech using a set of rules, e.g., by looking at the ending of the unknown word. For example in English, words ending in "ism" are guessed as nouns, words ending in "ing" are guessed as verbs.

At S406, which may be incorporated into S404, recapitalization rules are applied to the words of the query 12, based on the information retrieved from the lexicon.

Misspelling errors, particularly lack of proper capitalization, can be a problem for linguistic processing of complete sentences, in particular, for part-of-speech tagging and named entity recognition, which often use capital letter information as a triggering feature. Recapitalizing these words at the preprocessing step of a linguistic analysis, i.e., during the morphological analysis has not been considered for conventional text. In the context of full sentence parsing, considering all lower case words that can be proper nouns with a capital letter should also have capitalized interpretation (such as price, jean, read, us, bush, bob, . . . in English, or pierre, médecin, . . . in French) could generate spurious ambiguities, which would be problematic for a part-of-speech tagger as well as for a named entity recognizer.

In the present application, which considers the specific case of queries, however, queries are often written with misspelling errors, in particular for accents and capital letters of named entities, such as:

musee prado madrid (French query)
henry de forge et jean mauclère (French query)
cathedral saint isaac saint petersburg (English query)
bond fleming (English query)

Queries are far shorter, on average, than full sentences. The Preprocessing and PoS tagging (S204) can be adapted to this context. In one embodiment, recapitalization can be restricted to person names, first names, and places (locations). This can reduce ambiguity.

For example the following recapitalization rules, which combine lexical information and contextual constraints, can be applied:

At S408, words starting with a lower case letter which can be a first name (henry, jean, isaac, . . . ), according to the adapted lexicon 24, are assigned the features of the capitalized name. For example, henry is linked to Henry, and thereby receives the feature: proper name-firstname.

At S410, words starting with a lower case letter which can be a family name in the lexicon (mauclère, fleming, bond, . . . ), according to the adapted lexicon 24, are assigned the features of the capitalized name. For example, bond is linked to Bond, and thereby receives the feature: proper name lastname.

At S412, words starting with a lower case letter which can be place names with a capital letter (musee prado, madrid, saint petersburg, . . . ), according to the adapted lexicon 24, are assigned the features of the capitalized name. For example, madrid is linked to Madrid, and thereby receives the feature: proper name-placename.

At S414, for an unknown word starting with a lower case letter which is immediately preceded by a word recognized in the lexicon 24 as a first name (at S408), the unknown word is analyzed as being a last name. For example, for henry blatz (where blatz is not recognized in the lexicon 24), blatz can be given the features: proper name-last name.

At S416, for an unknown word starting with a lower case letter which is preceded by a word recognized in the lexicon 24 as a first name (at S408), and thereafter by a particle (i.e., a sequence of known first name, particle, unknown word) the unknown word is analyzed as being a last name. The lexicon recognizes a specific set of words as being particles (e.g., de du, d', den, der, des, la, le, l', ten, ter, van, von, as in henry de forge). Thus, for example, if the lexicon 24 recognizes friedrich as being a proper name-first name, when capitalized, given friedrich von hayek in a query, the unknown word hayek may be given the features of proper name-last name under this rule.

These exemplary rules relating to unknown words (S414 and S416) are able to trigger standard named entity recognition over the sequences (first name, last name) in which they are found. This is one example of interleaving of the processes: part-of-speech interpretation at S204 is conditioned by the recapitalization step (S406) which transmits information about recapitalization (e.g., via features within the parser) that subsequently trigger query-specific PoS disambiguation rules (see S204).

In another embodiment, at S418, rather than only recapitalizing certain words that are potential person/place names, the method may be expanded to other classes of proper nouns, optionally with appropriate context-related constraints. In one exemplary embodiment, all uncapitalized words that are recognized in the adapted lexicon 24 as being potential proper nouns are given the proper noun features (e.g., by linking an uncapitalized text element to the same lemma form as its capitalized equivalent(s)).

The recapitalization (S406) may be implemented within the preprocessing components of the parser within finite state transducers (see, for example Lauri Karttunen, "Applications of Finite-State Transducers in Natural Language Processing," in *Proc. CIAA*-2000, *Lecture Notes in Computer Science* (2000). For example, all words in the lexicon 24 are linked to their lemma (root) form, which in the case of verbs is the infinitive form and in the case of nouns is the singular form. In the case of lowercase text elements which are known in the lexicon to be a proper noun when capitalized, these text elements are linked to the same lemma as their capitalized form. Thus, they are linked in the lexicon to the information associated with the capitalized form, i.e., that it is a proper noun, e.g., of some specific type, such as person name, place name or the like. Thus, for example, new york has, as its lemma form, New York, and is thereby linked to the information that it is a proper noun of type: place name.

In one embodiment, the unknown word processing steps (S414, S416) can be performed by the parser within the part-of-speech tagging process, e.g., with a contextual rule.

In the recapitalization step, the recapitalization is not enforced, but is linked to the text elements as information to be used in the PoS tagging step.

For example, the analysis of the input query jean mauclère receives the following structure and dependency output with the standard French grammar:

NMOD_POSIT1(jean,mauclère)
0>GROUPE{NP{jean}   AP{mauclère}}

In this case, jean is a common noun and mauclère is an unknown word which has been guessed as an adjective by the lexical guesser. With the exemplary system, however, the following analysis may be provided (at S204):

NMOD(jean,mauclère)
PERSON_HUM(jean mauclère)
FIRSTNAME(jean,jean mauclère)

```
LASTNAME(mauclère,jean mauclère)
    0>GROUP{NP{NOUN{jean mauclère}}}
```

In this case, jean has been recognized as a first (given) name and consequently, the unknown word mauclère after it has been inferred as a proper noun (last name) by the PoS tagging contextual rule. The recapitalization process and part-of-speech interpretation are therefore interleaved.

In one embodiment the parser applies rules for correcting accents which are missing or incorrect. In this case, the lexicon 24 is searched to identify alternatives to unknown words. The accent correcting step may be performed before, during, and/or after the recapitalization step. In one embodiment, the accent correcting step is performed before recapitalization, enabling re-accented text elements to be associated with the recapitalization information.

PoS Tagging/disambiguation (S204)

In the context of query analysis, part-of-speech tagging is also adapted. Disambiguation involves the selection of one part of speech only for a given word when more than one part of speech is possible, based on the preprocessing output, i.e., one PoS is selected and any others are discarded. In the exemplary method, the recapitalization information associated with the query in S202 is used in PoS disambiguation.

It may be noted that standard PoS disambiguation strategy may include rule based methods and/or statistical methods, which are often based on hidden Markov models (see for example Jean-Pierre Chanod, et al., "Tagging French—comparing a statistical and a constraint-based method," in Proc. From Texts To Tags: Issues In Multilingual Language Analysis, EACL SIGDAT Workshop. pp. 58-64 (1995). These statistic or symbolic methods aim generally at disambiguating in the context of full sentences. However, queries are very different from full sentences. They are mostly nominal with sometimes infinitive, past participial, or gerundive insertions. For example, queries submitted for retrieving information from a collection of art-related objects may include:

coupe apollon (French query)
david playing harp for saul (English query)
stained glass angel (English query)
San Carlos Ibiza Balearic Islands Spain (English query)

While it is contemplated that existing methods could be adapted to address queries, in the exemplary embodiment, the correction of part-of-speech tags in the context of queries is easy to develop with a small set of rules. In queries, the main problems tend to arise from the ambiguity between noun and verb. A different solution is therefore adopted in the exemplary method that would not generally be suited to the processing of a standard sentence.

In general, the rules for PoS disambiguation favor the selection of nouns over verbs as PoS tags. The rules may be language specific, e.g., to reflect the normal order of word in a sentence in the language of interest.

Rules may be provided in memory which favor noun over verb interpretations (or in some cases, adjectives over verbs), optionally under certain contextual constraints. In one embodiment, for example, the tagging is corrected with one or more of the following contextual rules:

For English:
  a. In the case of verb/noun ambiguity for the first word of the query, select the noun interpretation (e.g., in "oil flask", oil is disambiguated as a noun rather than a verb).
  b. In the case of verb/noun ambiguity for the second word of the query, select the noun interpretation if the query starts with an adjective or a noun (e.g., in "young people social competences", select the noun interpretation for people, instead of verb).
  c. In the case of verb/noun ambiguity (except as otherwise provided in a) or b)), select the noun interpretation if the word is followed by a coordinating conjunction and a noun or if it is preceded by a noun and a coordinating conjunction (e.g., in "gauguin moon and earth", choose the noun interpretation for moon, instead of verb).
  d. In the case of ambiguity between an adjective and a past participle verb, select the adjective interpretation if the word is followed by a noun (e.g., in "stained glass angel", stained is disambiguated as an adjective instead of a past participle verb).

As will be appreciated, for applying rule c), the lexicon 24 includes words which are tagged as coordinating conjunctions. For English, the coordinating conjunctions listed in the lexicon may include the words: and, but, nor, for, and so.

For French:
  a. In case of verb/noun ambiguity for the first word of the query, select the noun interpretation (e.g., for "coupe apollon", coupe is tagged as a noun ("cup") rather than a verb ("cut")).
  b. In case of verb/noun ambiguity, select the noun interpretation if there is no person agreement with one of the previous nouns (e.g., "les frères bissons", frères is the third person plural for the word frère (brother) but bissons is the first person plural of the verb "bisser" (to darken). There is thus no agreement with the previous noun and bissons is treated as a noun (the submitter of this query probably intended to search for information on the two brothers named Bisson, rather than for brothers who are bisons).
  c. In case of verb/noun ambiguity, and only for a verb which is neither in the past participle form nor the infinitive form, select the noun interpretation if it is not followed by a determiner (e.g., in "tremblement terre lisbonne", terre is disambiguated as a noun instead of a verb ("terrer")). The exemplary lexicon 24 includes a list of French determiners (le, la, cette, etc.), i.e., words which are determiners are associated in the lexicon with that lexical information.

These rules can be applied sequentially. Thus if rule a) has disambiguated a first word as a noun, steps b and c need not be applied. Similarly, if either rule a) or b) has disambiguated a word as a noun, it is not necessary to proceed to step c). In another embodiment, a statistical method, such as a Hidden Markov Model may be used, where the probabilities are recomputed on a corpus of queries that have been manually annotated.

In one embodiment, the PoS tagging step may include the application of conventional rule based methods and/or statistical methods, as described above, for those words for which the specific query-based rules are not applicable. Alternatively, rule based methods and/or statistical methods may be applied as a pre-tagging step with the provision that the applied pre-tags may be discarded if the query-based rules give a different outcome.

Chunking (S206)

Chunking (sometimes referred to as "light parsing") is an analysis of a sentence which identifies the constituents (noun groups, verbs, verb groups, etc.), but does not specify their internal structure, nor their role in the main sentence, these roles being calculated by more complex processes. The goal of chunking is to assign a partial structure to a sentence. Chunking does not try to deal with all of the language and does not attempt to resolve all semantically significant decisions: it focuses on easy to parse pieces in order to avoid ambiguity and recursion. As a consequence, it is relatively easy to implement, fast and robust. Chunks are non-overlapping regions of text that (usually) contain a head with the possible addition of some preceding function words and modifiers. Consider, for example:

[SC when I read] [NP a sentence], [SC I read it] [NP a chunk] [PP at a time] (from Steven Abney, "Partial Parsing," Tutorial given at ANLP-94, Stuttgart. 1994).

In this output, the chunks are denoted by square brackets with a label corresponding to the type of chunk (SC=subordinating conjunction, NP=noun phrase, PP=prepositional phrase) One feature of the chunks is that chunks are not recursive, and non-exhaustive, i.e., not all words in a sentence may be grouped into a chunk. Additionally, chunks are typically subsequences of constituents (they do not cross constituent boundaries).

As examples, conventional chunks include:

Noun groups—everything in a noun phrase (NP) up to and including the head noun.

Verb groups—everything in a verb phrase (VP) (including auxiliaries) up to and including the head verb.

In the specific context of query analysis, in view of the specific linguistic properties of queries (they are not sentences but mostly nominal sequences), chunking can be improved by using one or more rules. The following adaptations can be used to improve query chunking to deal with adjectival phrase and prepositional phrase (AP and PP) attachment, and coordination, by using named entity information to guide the chunking strategy.

In standard cases of chunking, AP and PP attachment is not considered, because of attachment ambiguity problems that cannot be solved at this stage of linguistic analysis. In the case of queries, however, some of these attachments can be solved, and thus AP and /or PP attachment can be promoted. By attachment, it is meant that the AP (or PP) is placed in the same chunk as, i.e., linked to the nominal phrase, thereby modifying the (main) noun in the nominal phrase.

For adjectival attachments in French, one rule which may be implemented is to attach any post modifier adjectival phrases to the first previous noun with which there is agreement in both number and gender.

For example, with the standard French grammar, the chunking structure for the query "Bibliothèque europeenne numerique" is:

NP{Bibliothèque} AP{europeenne} AP{numerique}

With the adapted method, the chunking is:

NP{Bibliothèque AP{europeenne} AP{numerique}} i.e., the word numerique agrees in both number and gender with Bibliothèque so the three words can be included in the same chunk.

For PP attachment both in English and French, a rule in which the PP is attached to the previous noun / nominal phrase may be applied. For example, the chunking structure for "The history of the University of Oxford" is:

NP{the history PP{of {NP the University PP{of NP{Oxford}}}} instead of:

NP{The history} PP{of NP{the University}} PP{of NP{Oxford}}

Some cases of coordination, which are often too complex to be considered in standard chunking, can be solved in the query context, in particular when named entities are involved. For both English and French, in one embodiment, coordinates (two noun phrases linked by a coordinating conjunction) are attached when they belong to the same entity type (e.g., person conjunction person, date conjunction date, place conjunction place, etc.). For example:

"vase achilles and priam" is chunked as:

NP{NOUN{vase}} NP{NOUN{Achilles} CONJ{and} NOUN{priam}} instead of:

NP{NOUN{vase}} NP{NOUN{Achilles}} CONJ{and} NP{NOUN priam}}

In another rule, coordinates are attached when the second is introduced by a reflexive pronoun (i.e., a pronoun that is preceded by the noun to which it refers), such as in:

"Le laboureur et ses enfants La Fontaine", which is chunked as:

NP{le laboureur et ses enfants} NP{La Fontaine} instead of (with the standard grammar):

NP{le laboureur} et NP{ses enfants} NP{La Fontaine}

In another rule, coordinates within a PP are attached when they are introduced by the preposition "between," in English, or "entre," in French. For example:

"the battle between the Horatii and the Curia" is chunked as:

NP{the battle} PP{between NP{the Horatii and the Curia}} instead of:

NP{the battle} PP{between NP{the Horatii}} and NP{the Curia}, with the standard grammar.

When available, information about named entities present in the queries can be used to guide the query chunking strategy. In standard analysis, named entities are generally part of larger chunking units.

In queries, however, because of their strong semantic nature, named entities can be isolated as separate chunking units. The chunking strategy can thus be adapted using this information: when the parser detects a named entity (including a date), it chunks it as a separate NP. The following examples show the chunking results for this adapted strategy versus the analysis of standard grammar:

1. Input: "Allen Jones interesting journey" (English)

Adapted Chunking:

NP{NOUN{Allen Jones}} NP{AP{interesting} journey}

Standard Chunking:

NP{NOUN{Allen Jones} AP{interesting} journey}

2. Input: "Anglo Saxon 11$^{th}$ century" (English)

Adapted Chunking:

NP{Anglo Saxon} NP{NOUN h century}}

Standard Chunking:

NP{Anglo Saxon NOUN{11th century}}

3. Input "Alexandre le Grand Persepolis" (French)
Adapted Chunking:
    NP{NOUN{Alexandre le Grand}NP{NOUN{Persepolis}}
Standard Chunking:
    NP{NOUN{Alexandre le Grand} NOUN{Persepolis}}

This is another example where these two processing steps are interleaved, since the information about Named Entities is used to guide the chunking.

When applying the full chain (S106) on an example query like "gauguin moon and earth", the following steps and result are obtained:

Preprocessing (S202): gauguin is recognized as Gauguin (proper noun of celebrity);

Part of speech tagging: moon is disambiguated as a noun instead of a verb (to moon about);

Chunking: moon and earth are grouped together in a coordination chunk, gauguin is a named entity, and thus is chunked separately.

Accordingly, the following structure:
NP{gauguin} NP{moon and earth}
is obtained, and gauguin is recognized as a person name. This compares with the standard grammar processing, which gives:
NP{gauguin} FV{moon}} and NP{earth},
gauguin remaining unknown).

The query processed in the exemplary method is more likely to retrieve information that is useful to the submitted, since the user likely intended to find information about Paul Gauguin's painting, "The Moon and the Earth". Having "moon and earth" in the same chunk allows the search engine to look for these words in close relation in the document collection, while focusing the search on the painter, Gauguin.

Translation

The chunked query output from S106 can be input to a machine translation system 70, such as a statistical machine translation system, and thereafter, the resulting translated query may be used for cross language information retrieval. Conventional SMT systems do not use chunking information. The exemplary machine translation system can be adapted to make use of the chunks. For example, the machine translation system is instructed to translate the noun phrase chunks separately. Thus, it is more probable that all words in a noun phrase chunk will be aligned, in the translation, to words in the translated query and thus can be retained as a chunk for input to a search engine in the target language (language of the of translation).

In the case of a system in which a query is to be translated before performing information retrieval, an adapted named entities dictionary 84 may be incorporated into the translation system. The adapted named entities dictionary 84 may be created either by crawling an information source, such as Wikipedia, or other parallel resources. This allows correct translations of Named Entities to be used in the translated query. For example, for the source query romeo et juliette, not translating this named entity correctly results in the following translation: romeo and juliette, which is not as useful as romeo and juliet.

In other embodiments, e.g., where there is no available named entity dictionary, the machine translation system is instructed not to translate named entities.

While one application for the system and method presented is in the field of query translation, it is to be appreciated that other applications may include query classification. This may be performed using the lemmas identified from the linguistic analysis components (where PoS disambiguation can be very useful in order to choose the correct lemma) and visualization of the most popular lemmas or chunks or named entities for data analysis.

The method illustrated in FIGS. 2 and/or 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 2 and 3, can be used to implement the query processing method.

The exemplary system and method provide adaptations of a complete chain of interleaved linguistic processing, including, in some embodiments, lexical and context-based recapitalization, part of speech tagging giving priority to nominal interpretation of queries, and improved chunking for named entities, and modifier attachment.

The exemplary system and method find use in applications that deal with the analysis of text queries, related to IR in general, but also to data analytics methods employed by content providers. Some examples of such applications include:
1. CLIR (see Examples);
2. Query reformulation: adapted PoS tagging and chunking, NER, recapitalization are all of value to this application which aims to improve the search result returned to the user;
3. Better interpretation of user's search intentions, due in part to better chunking;
4. Query classification and clustering, visualization of the most popular lemmas or chunks or named entities for data analysis.

More generally the exemplary method can be used to enrich tools for data analytics for query logs and information access (mono- and multi-lingual).

Without intending to limit the scope of the exemplary embodiment, the following example illustrates the applicability of the method to query translation.

EXAMPLE

An exemplary system is constructed as shown in simplified form in FIG. 4. The Information Retrieval (IR) Component 36 is a native customer's search engine external to the exemplary system. There is no access to the internals of the search engine nor to the document collection of the customer.

The Linguistic Analysis Component 60 is used to perform the linguistic analysis of the query (including. PoS disambiguation and chunking). It takes as input the query and the language in which the query is and outputs the query units given to the machine translation component 70. The Machine Translation Component is used to translate the queries. It is enriched with adapted linguistic analysis from the previous step. The translated query unit is fed back to the customer's IR component 36. Such a query should return results in the target language(s).

To evaluate this system, an indirect method uses local information retrieval, based on query translation, in a public database.

For the experiments, a set of search logs was provided. These are real users' queries, where Named Entities are often lowercased and the structures are very different from normal phrase structure. Thus, this data is well adapted to demonstrate the impact of adapted linguistic processing.

As clearly illustrated from the above description the functionality proposed is based only on query translation (no other content is involved). The queries and source and target languages are provided to the system through an appropriate medium (e.g., web services).

As the translation system 70, Systran™ and Moses systems were used. Systran™ is a commercially available machine translation (MT) system, which is rule-based. This system is designed to translate full phrases. (see http://www.systran-soft.com/). Thus, it is not adapted for queries translation having a specific linguistic structure. Moses is a statistical MT toolkit (see http://www.statmt.org/moses/). It allows training of a probabilistic MT model, using no linguistic knowledge. The Europarl corpus is used to train a translation model with Moses (see, http://www.statmt.org/europarl/). Even if this model is not dependent on an input linguistic structure explicitly, it is trained on a corpus of full sentences. Thus, it is not really suitable for query translations. Raw query translation on both these system was evaluated and found to be relatively poor.

One of the problems with Systran was attributed to the lack of capitalization (journal panorama paris is translated into English as newspaper panorama bets). Another problem is that Systran also tends to look for a full sentence structure. Thus, for example, it prefers to translate an ambiguous word as a verb (vie et mort de l'image is translated into English as life and died of the image rather than life and death of the image).

The capitalization issue is less significant for Moses, since its model is trained on the lower-cased data and it uses context to disambiguate (journal panorama paris giving, in English, paris newspaper panorama). However, in some cases the lack of Named Entity chunks is a disadvantage (chopin george sand giving, in French, george sable chopin soit).

The lack of syntactic structure often leads to wrong word order in SMT translations in general. Normally, this problem is not crucial for queries, because most of the IR models do not take word order into account. However, in some cases different word order provided to an SMT system could lead to a better lexical choice.

Also, word order may be relevant for some types of queries. For example, for the queries of the type "NP1 and NP2" or "NP1 or NP2" it is beneficial to preserve a good structure in the translation, in case "and/or" is interpreted as a logical operator.

Experiments

An adapted linguistic processing of the type disclosed herein can be beneficial for query translation. The open source toolkit Moses (trained on Europarl) was used for query translations. A set of French logs, which contains a total 8870 distinct queries, was translated with the following translation models:

1. Baseline Moses : Moses trained on Europarl (Moses)
2. Baseline Moses enriched with linguistic processing based on basic grammar (Moses+basic grammar)
3. Baseline Moses enriched with linguistic processing based on adapted grammar (Moses+adapted grammar)

The evaluation focused on:

1. The impact of linguistic processing on the final query translations; and
2. The impact of grammar adaptation in the context of query translation.

TABLE 1 shows the general impact of linguistic enrichment and grammar adaptation on query structure and translation.

TABLE 1

| Linguistic enrichment | |
| --- | --- |
| Number of queries treated differently by linguistically enriched Moses (with adapted grammar) | 2311 (26%) |
| Number of translations which differ between baseline Moses and enriched Moses (with adapted grammar) | 582 (25% of 2311) |
| Grammar adaptation | |
| Number of queries having different structures between basic grammar and adapted grammar | 3756 (42%) |
| Number of translations which differ between Moses + basic grammar and Moses + adapted grammar | 636 (16% of 3756) |

It can be seen that the linguistic processing may impact about 25% of translations (because the translated query is different) and that about 25% of the impacted translations actually differ from a baseline translation.

The same observation is true for differences between basic grammar and adapted grammar: about 40% of queries have a different structure after grammar adaptation, and about 16% of those queries actually receive different translations.

A syntax-aware machine translation system may be expected to have profited even more from an adapted linguistic structure.

Two evaluation tasks were defined, where the goal of each task is to compare two translation models. The following are compared:

1. Baseline translation model (Moses) versus linguistically enriched translation model (Moses+adapted grammar). This task evaluates the impact of linguistic enrichment in the query translation task.
2. Translation model using basic grammar versus translation model using adapted grammar. This task evaluates the impact of linguistic adaptation for the query translation task.

For each evaluation task, a sample of 200 translations was randomly selected (excluding the translations which are the same for the two models which are being compared). A pair of translations are then evaluated on different aspects:

1. The Overall Translation Performance (Translation Quality)

This is evaluated manually by comparing two translations produced by different translation models. It is evaluated independently of the task in which the translations are going to be used afterwards (text understanding, text analytics, cross-lingual information retrieval, etc.) The evaluation distinguishes, however between slight improvements and significant improvements as in the example below.

EXAMPLE src1: max weber
   t1: max mr weber
   t2: max weber (slight improvement)
src2: albert camus la peste
   t1: albert camus fever
   t2: albert camus the plague (significant improvement)

First, the translation quality is manually evaluated. It is evaluated by comparing the two translations produced by the different translation models. Thus, each pair of translations (t1, t2) receives a note from the scale [−2, 2]:
   i. 2, if t2 is much better than t1,
   ii. 1, if t2 is better than t1,
   iii. 0, if t2 is equivalent to t1,
   iv. −1, if t1 is better than t2,
   v. −2, if t1 is much better than t2, 2. The translation Performance in the Context of Cross-lingual Information Retrieval Since there is no access to a document collection, this evaluation is also performed manually. In the evaluation, the translation differences which could be expected to impact the IR quality to some extent are manually noted.

For example, a better lexical choice (don juan moliere vs donation juan moliere) in the translation can be expected to lead to a better retrieval, while a simple word order (dali paints salvador vs salvador dali paints) does not change a retrieval results in most of the retrieval models.

Thus, a pair of translations (t1, t2) receives:
   1, if t2 can give a better retrieval than t1
   0, if t1 and t2 are equivalent from IR point of view (or if it is unknown what impact t1 or t2 might have)
   −1, if t1 can give a better retrieval than t2

TABLE 2 presents the results of the general translation evaluation and TABLE 3, the results of translation evaluation in the context of cross-lingual information retrieval.

In the following:
Sig++ (−−): the number of significant improvements (decreases);
Total nb+ (−): total number of translations showing improvements (decreases), not distinguishing whether it is slight or significant; and
Total: the overall score (adding both positive and negative scores, using the scoring method: total score=2*(nb++)+(nb+)−2*(nb−)−(nb−).

TABLE 2

Translation Evaluation

|  | Total nb+ | Total nb− | Total (nb+ and nb−) |
|---|---|---|---|
| Moses < Moses + adapted | 46 | 10 | 36 |
| Moses + basic < Moses + adapted | 40 | 10 | 30 |

TABLE 3

Translation evaluation in CLIR

|  | Sig++ | Total nb+ | Sig−− | Total nb− | Total |
|---|---|---|---|---|---|
| Moses < Moses + adapted | 35 | 87 | 4 | 19 | 99 |
| Moses + basic < Moses + adapted | 28 | 66 | 2 | 12 | 78 |

From these results, it can be concluded that the adapted linguistic processing can indeed be useful in the query translation task (in CLIR context and potentially also in the general text analysis context). Creating an adapted named entities dictionary, either by crawling Wikipedia, or other parallel resources, might be helpful in some cases.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for processing queries, comprising:
providing access to a lexicon in which a set of text elements that each start with a lowercase letter are each recognized in the lexicon as being a proper noun when in a capitalized form, each of text elements in the set of text elements starting with a lowercase letter being linked in the lexicon to a respective capitalized form;
receiving a natural language query to be processed, the query comprising a sequence of text elements, the text elements comprising words;
with a computer processor, processing the query comprising:
assigning part of speech (POS) features from a list of POS features to the text elements in the query, including:
for a text element in the query which starts with a lowercase letter and which is among the set of text elements in the lexicon that are recognized as being a proper noun when in a capitalized form, assigning recapitalization information to the query text element, the recapitalization information comprising a part of speech feature of the capitalized form;
disambiguating part of speech features for the text elements in the query including applying rules for recapitalizing text elements based on the recapitalization information; and
chunking the disambiguated query; and
outputting the processed query.

2. The method of claim 1, further comprising translating the chunked, disambiguated query and wherein the outputting comprises outputting the translated query.

3. The method of claim 1, wherein the outputting of the processed query includes outputting the processed query to a client device for querying a document collection.

4. The method of claim 1 wherein the recapitalization information comprises information that the capitalized form has one of a person name and place name feature.

5. The method of claim 1, wherein the assigning includes applying rules for associating recapitalization information with a word which is unknown in the lexicon.

6. The method of claim 5, wherein the rules include a rule which, for word that is unknown in the lexicon and which starts with a lower case letter which is preceded by a word recognized in the lexicon as being a first name, the unknown word is associated with feature corresponding to a last name.

7. The method of claim 5, wherein the rules include a rule which, for word that is unknown in the lexicon and which starts with a lower case letter which is preceded by a first name and thereafter by a particle, the unknown word is associated with feature corresponding to a last name.

8. The method of claim 1, wherein the disambiguating part of speech features for the text elements in the query comprises applying the rules for recapitalization, whereby a text element starting with a lowercase letter is capitalized in the query and associated with a part of speech when one of the rules is satisfied.

9. The method of claim 8, wherein at least one of the recapitalization rules is language specific.

10. The method of claim 1, wherein the part of speech disambiguation includes applying contextual rules which favor assigning nouns rather than verbs as part of speech features.

11. The method of claim 1, wherein the query natural language is English and the part of speech disambiguation includes applying at least one contextual rule selected from:
   a. a rule which in the case of ambiguity between a verb and a noun for a first word of the query, selects the noun as the part of speech for the first word;
   b. a rule which in the case of ambiguity between a verb and a noun for a second word of the query, selects the noun as the part of speech for the second word if the query starts with an adjective or a noun;
   c. a rule which in the case of ambiguity between a verb and a noun for a word of the query, selects the noun as the part of speech for the word if the word is followed by a coordinating conjunction and a noun or if it is preceded by a noun and a coordinating conjunction; and
   d. a rule which in the case of ambiguity between an adjective and a past participle verb, selects the adjective as the part of speech if the word is followed by a noun.

12. The method of claim 1, wherein the query natural language is French and the part of speech disambiguation includes applying at least one contextual rule selected from:
   a. a rule which in the case of ambiguity between a verb and a noun for the first word of the query, selects the noun as the part of speech for the first word;
   b. a rule which in the case of ambiguity between a verb and a noun for a word of the query other than a first word of the query, selects the noun as the part of speech for the word if there is no person agreement with one of the previous nouns in the query; and
   c. a rule which in the case of ambiguity between a verb and a noun for a word of the query, wherein the verb is neither in the past participle form nor the infinitive form, selects the noun as the part of speech for the word if it is not followed by a determiner.

13. The method of claim 1, wherein the chunking comprises, for a text element which is recognized in the lexicon as being a named entity, applying a rule whereby a chunk includes solely the named entity, without other words.

14. The method of claim 1, wherein the chunking comprises providing a rule for attaching a prepositional phrase or adjectival phrase to the closest antecedent that is morphologically compatible with it.

15. The method of claim 1, wherein the providing of the lexicon includes providing a lexicon in which text elements are each linked to a lemma form of the text element and in which lowercase text elements which are known to be a proper noun when capitalized are linked to the same lemma form as their capitalized form.

16. A system for performing the method of claim 1 comprising memory which stores instructions for performing the method and a processor in communication with the memory for executing the instructions.

17. A computer program product comprising a non-transitory recording medium storing instructions, which when executed by a computer, perform the method of claim 1.

18. A system for processing queries, comprising:
   a lexicon which stores a set of text elements that start with a lowercase letter that are indexed as being proper nouns when in a capitalized form in which the first letter is capitalized;
   memory which receives a natural language query to be processed, the query comprising a sequence of text elements, the text elements comprising words;
   a linguistic analysis component for processing the query, comprising:
      a preprocessing component for preprocessing the query, the preprocessing component assigning part of speech features to the text elements in the query, the assigning including assigning recapitalization information to the text elements which are in the set of text elements, the recapitalization information comprising proper noun information of the capitalized form of the text element;
      a part of speech disambiguation component for disambiguating part of speech features for the text elements in the query, the part of speech disambiguation component applying rules for recapitalizing text elements based on the recapitalization information; and
      a chunking component for chunking the disambiguated query; and
   a processing component for implementing the linguistic analysis component.

19. The system of claim 18, further comprising a translation component for translating the processed query into a natural language other than the natural language of the input query.

20. The system of claim 19, further comprising memory which stores a list of named entities and their translations into the other natural language.

21. The system of claim 18, further comprising an information retrieval component which retrieves the processed query and retrieves documents that are responsive to the processed query.

22. A method for processing queries, comprising:
   generating a lexicon comprising a set of text elements that start with a lowercase letter and which are recognized as being proper nouns when in a capitalized form of the text element, each of text elements in the set of text elements starting with a lowercase letter being linked in the lexicon to a respective capitalized form;
   receiving a natural language query to be processed, the query comprising a sequence of text elements, the text elements comprising words;
   with a computer processor, processing the query comprising:
   assigning part of speech features to the text elements in the query, the assigning including:
      for a text element in the query which is among the set of text elements in the lexicon which are recognized as being proper nouns when in a capitalized form, assigning recapitalization information to the text element, the recapitalization information comprising a part of speech feature of the capitalized form of the text element;
   disambiguating any ambiguous part of speech features for the text elements in the query, comprising applying rules for recapitalizing text elements based on the recapitalization information; and
   outputting the processed query.

* * * * *